(12) United States Patent
Tai et al.

(10) Patent No.: US 6,401,749 B1
(45) Date of Patent: Jun. 11, 2002

(54) ASYMMETRICALLY LOADED CHECK VALVE

(75) Inventors: Shaiw-wen Tai, Livingston; Jeffrey Ballini, Wantage; Jing-Chau Wu, Morris Plains, all of NJ (US)

(73) Assignee: Parker Hannifin Corporation, OH (US)

( * ) Notice: Subject to any disclaimer, the term of this patent is extended or adjusted under 35 U.S.C. 154(b) by 0 days.

(21) Appl. No.: 09/623,099

(22) PCT Filed: Jun. 10, 1999

(86) PCT No.: PCT/US99/13104
§ 371 (c)(1),
(2), (4) Date: Aug. 28, 2000

(87) PCT Pub. No.: WO00/03167
PCT Pub. Date: Jan. 20, 2000

Related U.S. Application Data
(60) Provisional application No. 60/092,179, filed on Jul. 9, 1998.

(51) Int. Cl.[7] ............................................. F16K 15/02
(52) U.S. Cl. .................... 137/540; 137/514; 137/515.5; 251/64; 251/337
(58) Field of Search ........................... 137/514, 515.5, 137/540; 251/64, 337

(56) References Cited

U.S. PATENT DOCUMENTS
2,827,077 A * 3/1958 Mitchell .................... 251/64
3,783,894 A 1/1974 Davison
5,727,594 A 3/1998 Choksi
5,950,652 A * 9/1999 Morgan ...................... 251/337

FOREIGN PATENT DOCUMENTS
GB 644971 10/1950

* cited by examiner

Primary Examiner—Michael Powell Buiz
Assistant Examiner—Ramesh Krishnamurthy
(74) Attorney, Agent, or Firm—Anthony J. Casella; Gerald E. Hespos

(57) ABSTRACT

A check valve is provided with first and second housing components that are telescoped together to define a valve housing having an inlet, an outlet and a valve chamber therebetween. The valving element is disposed in the valve chamber for movement between a first position where the valving element seals the inlet to the valve chamber and a second position where the valving element permits flow from the inlet, through the valve chamber and to the outlet. A disk spring has a central support secured to the valving element and an outer support secured between the first and second components of the housing. The disk spring is disposed to bias the valving element into a closed position. However, sufficient gas forces in the inlet will overcome the forces of the spring and open the valve. The spring is asymmetrical to prevent noise attributable to fluttering of the valving element and to achieve a more rapid opening response. The first and second housing components are welded to one another at a location spaced from the spring to prevent heat related damage to the spring.

6 Claims, 4 Drawing Sheets

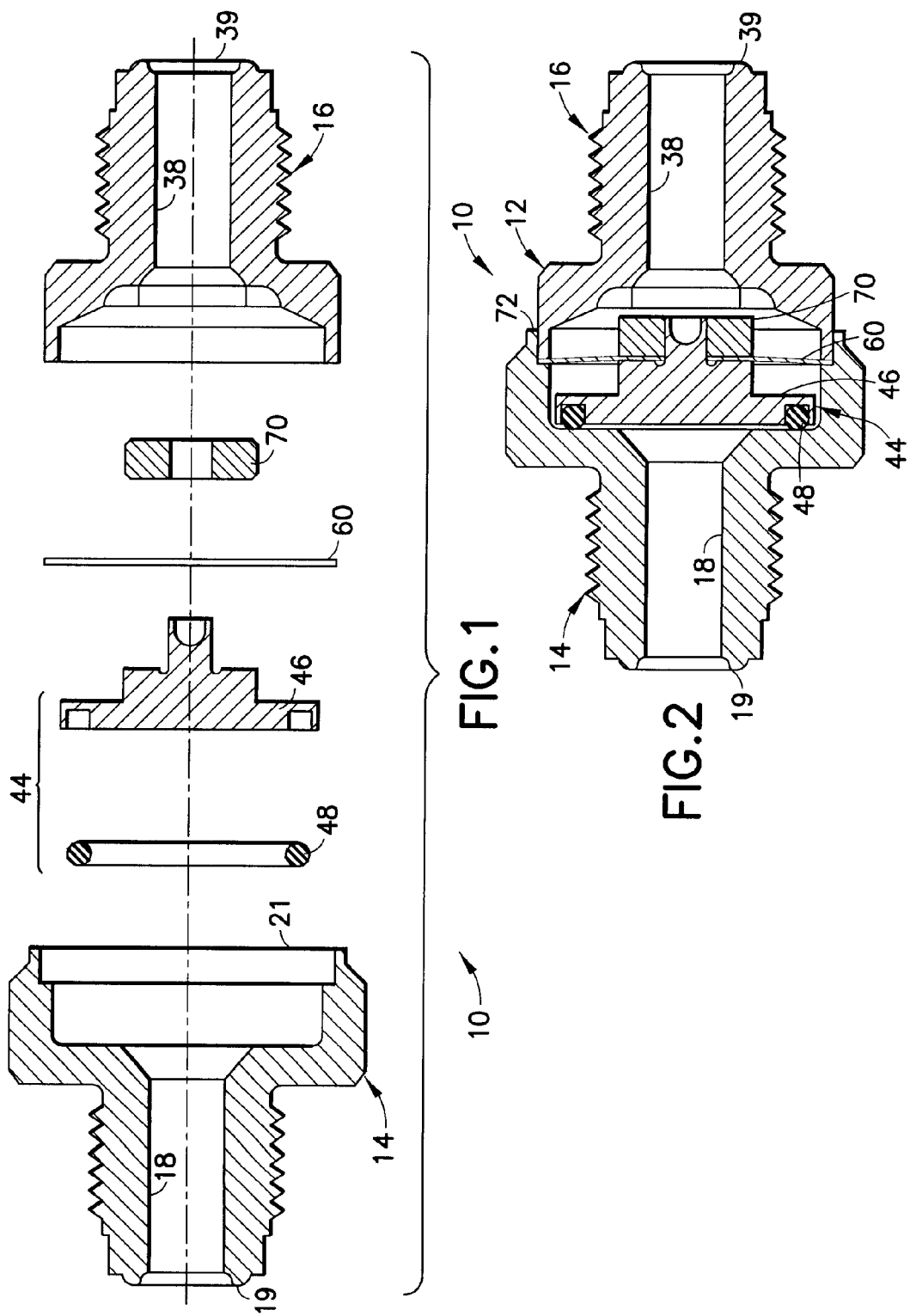

ASYMMETRICALLY LOADED CHECK VALVE

This application is a 371 of PCT/U.S. 99 13104 filed Jun. 10, 1999 which claims benefit of 60/092,179 filed Jul. 9, 1998.

BACKGROUND OF THE INVENTION

1. Field of the Invention

The subject invention is directed to check valves for use in ultra high purity gas flow environments.

2. Description of the Prior Art

The prior art check valve includes a valve housing that is formed or machined to define a valve chamber. The valve housing further is formed or machined to include an inlet extending from an external location into the valve chamber and an outlet extending from the valve chamber to a second external location. Portions of the valve housing that surround the inlet to the valve chamber are configured to define a valve seat. The prior art check valve further includes a valving element that is configured to sealingly engage the valve seat for blocking flow into the valve chamber. On the other hand, the valving element can move away from the valve seat to permit flow from the inlet into the valve chamber.

The prior art check valve further includes a biasing member that urges the valving element into sealing engagement with the valve seat. Thus, the prior art check valve assumes a normally closed position. However, the valving element of the prior art check valve will move away from the valve seat and into its open position if forces exerted by fluid pressure in the inlet exceed the forces exerted by the biasing member. Prior art check valves often are used in situations where it is necessary to prevent contaminants generated at downstream locations from flowing through an unpressurized line and into an upstream location.

Many industrial processes require a very pure flow of a specified gas. Check valves used in these environments must prevent ambient air from flowing into the valve chamber from the surrounding environment. The valve chamber can be sealed securely by welding the components of the prior art valve housing entirely around their engaged faces. However the heat generated during welding can affect the performance and life of the biasing member. Additionally, contaminants from the weldment can leach into the valve.

Many prior art check valves employ a disk-shaped valving element that is intended to be moved in directions substantially along the axis of symmetry of the disk. It has been found that disk-shaped valving elements of these prior art check valves generate a very bothersome noise for a considerable period of time following the opening of the valve. The noise is believed to be attributable to a fluttering of the disk-shaped valving element in the valve chamber of the prior art check valve.

It is desirable to have check valves that respond quickly to fluid pressure in the inlet. However, it is also desirable to have sufficient strong forces exerted by the biasing member of the prior art check valve to ensure secure sealing. These seemingly opposed objectives typically have been resolved in favor of the sealing forces. Thus, many prior art check valves provide relative slow opening responses.

In view of the above, it is an object of the subject invention to provide a check valve that is well suited for use in ultra high purity gas flow environments.

It is another object of the subject invention to provide a check valve that avoids generating noise during and after opening.

It is a further object of the subject invention to provide a check valve that provides secure sealing of the inlet while still permitting a desirably quick opening response.

SUMMARY OF THE INVENTION

The subject invention is directed to a check valve having a valve housing formed from a first housing component and a second housing component. The first housing component is configured to define an inlet to the valve and a portion of a valve chamber. The second housing component is configured to define an outlet from the valve and a portion from the valve chamber. The first and second housing components are mateable with one another to define an enclosed valve chamber that communicates only with the inlet to the valve and the outlet from the valve. Mating portions of the first housing component and second housing component may be configured to telescope with one another, and the end of the outer telescoped housing component may be welded to the inner telescoped housing component. The weldment securely seals the valve chamber from the ambient environment, while the location of the weldment substantially prevents contaminants from the weldment teaching into the valve chamber.

Portions of the second housing component may be formed or machined to define a plurality of gas flow channels substantially at an interface region between the valve chamber and the valve outlet. The gas flow channels in the second housing component substantially prevent the valving element described below from blocking the valve outlet.

The check valve of the subject invention further includes a substantially disk-shaped valving element movably disposed in the valve chamber. The valving element is configured to sealingly engage the valve seat that surrounds the inlet to the valve chamber for substantially preventing a flow of gas through the valve. For this purpose, the valving element may include a sealing face to which a seal ring is mounted for sealing engagement with the valve seat. The valving element defines an outer periphery that is dimensioned and/or configured to permit a flow of gas around the valving element when the valving element is spaced from its sealing engagement with the valve seat. More particularly, the valve chamber may include a substantially cylindrically generated inner surface, and the valving element may have a cylindrically generated outer surface that is sufficiently smaller than the cylindrically generated inner surface of the valve chamber to permit gas flow there between. Alternatively, the valve housing and/or the valving element may be configured to define gas flow channels for accommodating a flow of gas when the valving element is spaced from its sealing engagement around the inlet to the valve.

The check valve of the subject invention further includes a substantially disk-shaped spring extending between the valving element and the valve housing. The spring is configured and disposed for urging the valving element toward and into sealing engagement with the valve seat. The spring may be a substantially planar disk that is stamped, machined and/or formed to define a plurality of legs extending between portions of the spring that are connected to the valving element and portions of the spring that are connected to the valve housing. Regions of the spring between the legs accommodate a flow of gas from the inlet to the outlet when the valving element is spaced from its sealing engagement with the valve seat. The legs of the spring preferably extend in non-radially directions, and may include portions that extend substantially helically. Thus, radially inner and radially outer portions of the spring are easily deflectable relative to one another.

The legs of the disk-like spring preferably are non-symmetrically spaced around the axis of the spring. For example, the spring may include two legs that extend from inner or outer locations on the spring that are spaced from one another by approximately 120°. Thus, a large arc segment of the spring will exist without legs extending between the valving element and the valve housing. This configuration results in an asymmetrical or non-uniform application of forces exerted by the spring between the valve housing and the valving element. These non-uniform forces substantially prevent the generation of a resonant condition in the valving element that would cause a noise-generating flutter in the valving element. As a result, the valve of the subject invention is substantially quieter than prior art check valves and leads to a substantially improved work environment. Additionally, the non-symmetrical loading achieved by the spring causes one side of the spring to initially lift from sealing engagement from the valve housing. Other parts of the spring then rapidly follow the initial movement of the valving element from sealing engagement. This characteristic is roughly comparable to separating a suction cup from a surface by initially lifting one side of the suction cup rather than pulling the suction cup axially. Consequently, the spring employed in the subject check valve results in a very rapid opening response.

Central portions of the disk-like spring may be connected to the valving element, and outer portions of the disk-like spring may be connected to the valve housing. More particularly, central portions of the spring may be securely affixed between two components of the valving element that are staked together near the longitudinal axis of the valving element. Similarly, outer portions of the spring may be secured between the first and second housing components. This configuration and disposition of the spring relative to the valving element and to the housing components is conducive to the above-described asymmetrical configuration of the spring and the above-referenced advantages thereof. Additionally, this dispositioning of the spring enables the spring to be isolated from the heat of welding, as explained herein.

In use, the spring urges the valving element into a normally closed in which the valving element sealingly engages the valve seat. Pressurized gas directed into the inlet of the valve housing will exert forces on the sealing face of the valving element. Sufficient forces exerted by gases in the inlet will overcome the forces exerted by the spring. However, due to the non-symmetrical nature of the spring, these gas forces will cause one side of the valving element to lift away from sealing engagement with the valve seat. Other portions of the valving element will follow quickly, and the valving element will move away from the inlet and into a fully opened condition. The asymmetrical forces exerted by the spring will prevent the establishment of a resonant condition that would cause a rocking or fluttering of the valving element in the chamber and that would generate an objectionable noise. The movement of the valving element in the opening direction may extend until the valving element engages portions of the second housing component surrounding the outlet to the valve. However, channels formed in the second housing component prevent a complete blockage of the outlet and ensure a continuous flow of gas between the axially aligned inlet and outlet. Upon termination or significant reduction of the gas flow toward the inlet, the spring will urge the valving element back into sealing engagement with the valve housing. The asymmetrical configuration of the spring may cause one side of the valving element to contact the valve housing initially. However, remaining portions of the valving element will move quickly into complete sealing engagement with the valve housing.

BRIEF DESCRIPTION OF THE DRAWINGS

FIG. 1 is an exploded longitudinal cross-sectional view of a check valve in accordance with the subject invention.

FIG. 2 is a longitudinal cross-sectional view of the check valve in its assembled condition.

DETAILED DESCRIPTION OF THE PREFERRED EMBODIMENT

Figure 3:
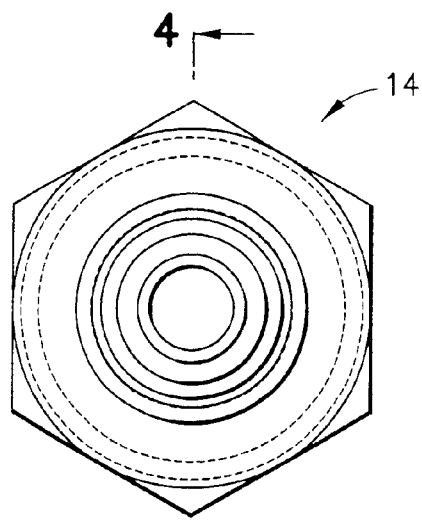
FIG. 3 is an end elevational view of the first housing component as viewed from the left in FIG. 1.

A check valve in accordance with the subject invention is identified generally by the numeral 10 in FIGS. 1 and 2. As shown most clearly in FIG. 2, the check valve 10 includes a valve housing 12 which is formed from a first housing component 14 and a second housing component 16.

Figure 4:
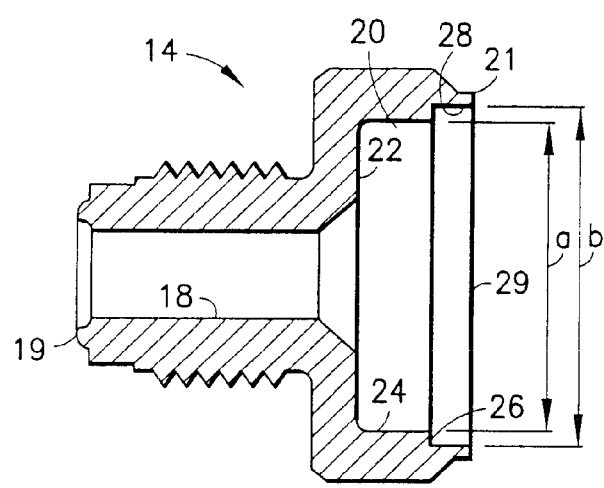
FIG. 4 is a cross-sectional view taken along line 4—4 in FIG. 3.

The first housing component 14, as shown most clearly in FIG. 4, is of generally stepped cylindrical configuration and includes an inlet 18 extending into one longitudinal end 19 and a first chamber recess 20 extending from the inlet 18 to the opposed end 21 of the first housing component 14. The first chamber recess 20 includes a valve seat 22 aligned substantially orthogonally to the axis of the inlet 18. A first cylindrical chamber wall 24 is generated concentrically with the inlet 18 and defines an inside diameter "a". A stop wall 26 extends radially outwardly from the end of the first cylindrical chamber wall 24 remote from the valve seat 22. The stop wall 26 will define a limit of engagement of the first and second housing components 14 and 16 as explained further below. A cylindrical engagement wall 28 extends from the stop wall 26 to the end 21 of the first housing component 14 opposite the inlet 18. The cylindrical engagement wall 28 defines an inside diameter "b" which exceeds the inside diameter "a" of the cylindrical chamber wall 24.

Figure 5:
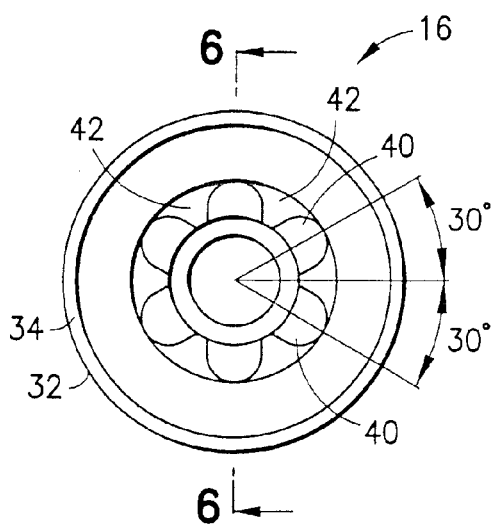
FIG. 5 is an end elevational view of the second housing component as viewed from the left side of FIG. 1.
Figure 6:
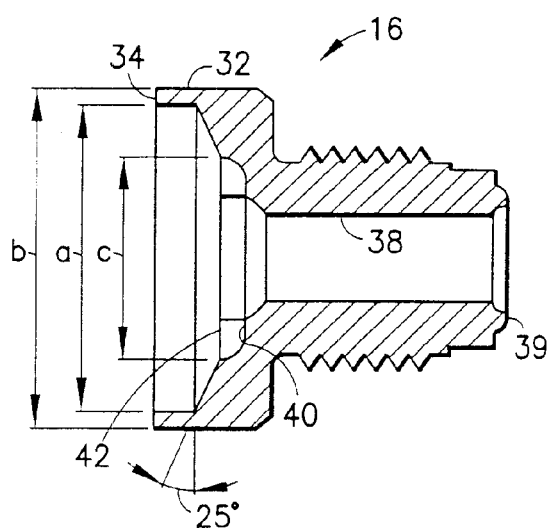
FIG. 6 is a cross-sectional view taken along line 6—6 in FIG. 5.

The second housing component 16 also is of generally stepped cylindrical configuration, as shown in FIGS. 5 and 6, and includes a second chamber recess 30 defined by a cylindrical chamber wall 32. The cylindrical chamber wall 32 has an annular end face 34 that is substantially planar and aligned substantially orthogonally to the axis of the second housing component 16. The cylindrical chamber wall 32 defines an inside diameter "a" substantially equal to the inside diameter "a" of the first chamber recess 20 in the first housing component 14. Additionally, the cylindrical chamber wall 32 further defines an outside diameter approximately equal to or slightly less than the inside diameter "b" of the cylindrical engagement surface 28 on the first housing component 14. Thus, a cylindrical wall 32 of the second housing component 16 can be telescoped into a cylindrical engagement wall 28 of the first housing component 14 to define a substantially enclosed chamber as shown in FIG. 2. Telescoped engagement of the first and second housing component is limited by engagement between the end face 34 of the cylindrical wall 32 on the second housing component with the stop face 26 on the first housing component 14.

The second housing component 16 further includes an outlet 38 that extends from the first chamber recess 30 to the opposed axial end 39 of the second housing component 16. Portions of the second housing component 16 at the interface of the second chamber recess 30 and the outlet 38 are characterized by a plurality of angularly spaced arcuate channels 40 which are separated from one another by stop walls 42. The radially outer ends of the channels 40 define a circular locus of points having a diameter "c" as shown in FIG. 6.

Figure 7:
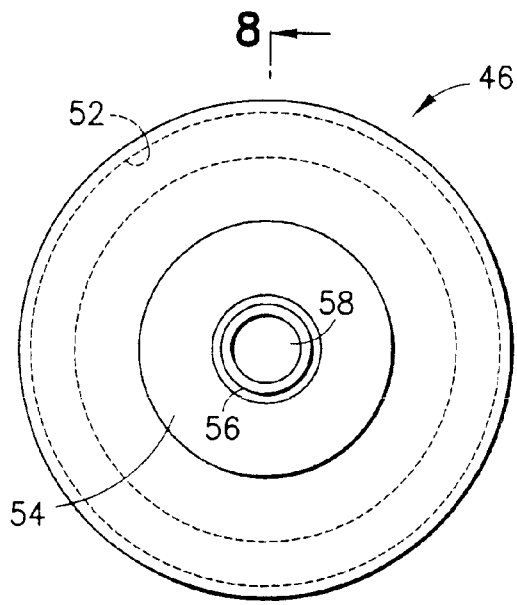
FIG. 7 is an end elevational view of the poppet as viewed from the right in FIG. 1.
Figure 8:
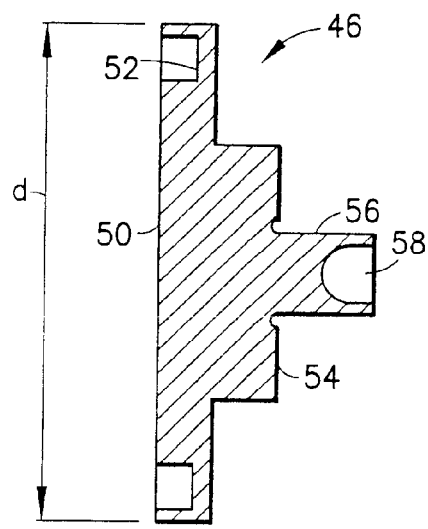
FIG. 8 is a cross-sectional view taken along line 8—8 in FIG. 7.
Figure 9:
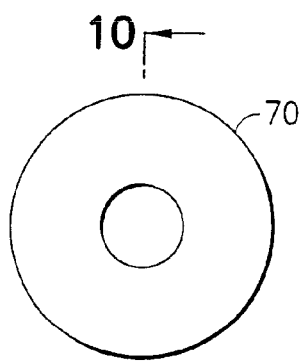
FIG. 9 is an end elevational view of the backstop.
Figure 10:
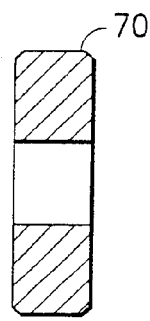
FIG. 10 is a cross-sectional view as taken along line 10—10 in FIG. 9.

The check valve 10 further includes a valving element 44 formed from a poppet 46 and a seal ring 48. The poppet 46, as shown in FIGS. 7 and 8, is a substantially disk-shaped element having a substantially planar sealing face 50 defining an outside diameter "d" which is less than the inside diameter "a" of the first and second chamber recesses 20 and 30 of the first and second housing components 14 and 16 respectively. The difference between the dimensions "a" and "d" is selected to provide a total annular area between the poppet 46 and the valve housing 12 at least equal to the cross-sectional areas of the inlet and outlet 18 and 38 respectively to ensure the substantially unimpeded flow of gas through the valve when the valving element assembly 44 is in the open condition as described below. The sealing face 50 is further characterized by an annular groove 52 having a slightly dovetailed configuration. The seal ring 48 formed from a resilient substantially inert material, such as Vitron, and is retained in the groove 52 by the dovetailed configuration.

Portions of the poppet 46 opposite the seal face 50 include a spring support face 54 aligned substantially parallel to the seal face 50. A backstop support 56 extends axially from the spring support face 54. The backstop support 56 includes a generally concave end 58 to facilitate a mechanical deformation, staking or welding of the backstop support 56, as explained further herein.

Figure 11:
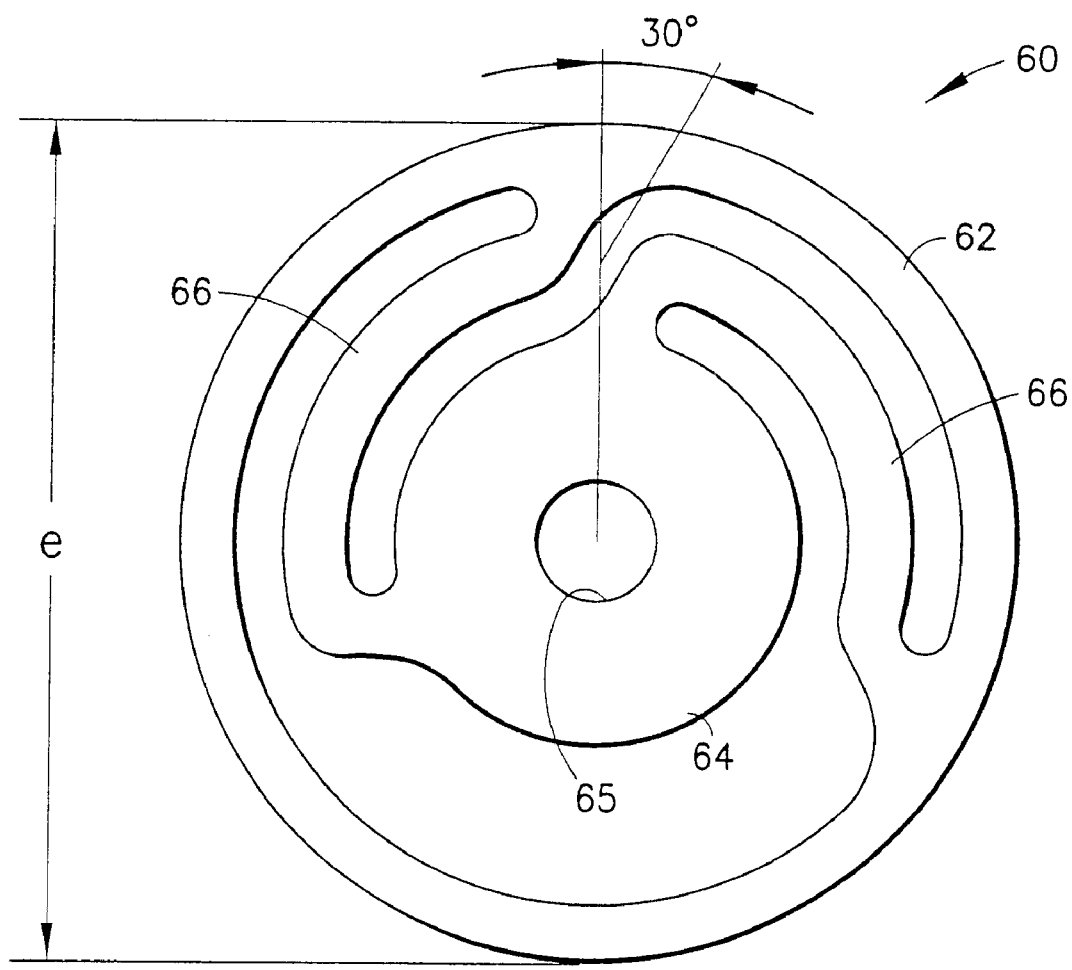
FIG. 11 is a plan view of the spring.

The check valve 10 further includes a disk spring 60 formed from a substantially planar sheet of a hard metallic material that is substantially inert and that exhibits desirable spring characteristics. For example, the disk spring 60 may be formed from an Elgiloy metallic alloy having a thickness of approximately 0.007 inch. Disk spring 60 is substantially circular and includes a substantially annular outer support rim 62, an annular inner support rim 64 and spring legs 66 extending therebetween, as shown in FIG. 11. The outer support rim 62 defines an outside diameter "e" which is greater than the inside diameter "a" of the chamber recesses 20 and 30, but slightly less than the inside diameter "b" of the retaining wall 28 on the first housing component 14. Thus, as explained further herein, the annular outer support rim 62 of the spring 60 can be seated adjacent the stop face 26 of the first housing component 14 and can be retained in that position by the end face 34 of the second housing component 16.

The annular inner support rim 64 of the disk spring 60 includes a central aperture 65 dimensioned to telescope over the backstop support 56 of the poppet 46. The annular inner support rim 64 further includes an outside diameter approximately equal to the outside diameter of the spring support face 54 of the poppet 46.

The spring legs 66 extend substantially helically between the outer annular support 62 and the inner annular support 64. More particularly, each spring leg 66 includes a connecting portion that extends from the outer annular support 62 at an angle of approximately 30° to a radius of the spring 60 and an inner connecting portion that also is aligned at a slight angle to the radius. A generally circumferentially extending portion extends between these ends of each spring leg 66. This generally helical orientation of each spring leg 66 is provided to accommodate flexion or axial movement between the annular outer support rim 62 and the annular inner support rim 64 as the valve opens and closes.

Significantly, the spring legs 66 are not equally spaced around the center of the spring 60. More particularly, in the embodiment shown herein, two spring legs 60 are spaced from one another by approximately 120°. Thus, in this embodiment, a third spring leg that would have lead to an equal angular distribution of the spring legs 66 about the spring 60 is not provided. This non-symmetrical distribution of the spring leg 66 contributes to a desirable performance of the subject check valve, as explained below.

The check valve 10 further includes a generally annular backstop 70 having a central aperture dimensioned to telescope over the backstop support 56 of the poppet 46. The backstop 70 further includes an outside diameter approximately equal to the outside diameter of the spring support 54.

The check valve 10 is assembled by initially placing the central aperture of the annular inner support rim 64 of the spring 60 over the backstop support 56 until the annular inner support rim 64 of the spring 60 rests against the spring support face 54 of the poppet 46. The backstop 70 then is mounted over the backstop support 56 of the poppet 46. Portions of the backstop support 56 adjacent the concavity 58 then are welded to the backstop 70 or are deformed outwardly to securely retain the backstop support against the spring 60. The seal ring 52 then is urged into the annular undercut 52 in the sealing face 50 of the poppet 46.

The subassembly comprising the poppet 46, the seal ring 48, the spring 60 and the backstop 70 then are positioned in the first chamber recess 20 of the first housing component 14, such that the sealing face 50 of the poppet 46 is positioned on the valve seat 22 of the first chamber recess 20. In this position, the annular outer support rim 62 of the spring 60 will be positioned on the stop face 26 of the first housing component 14. The cylindrical chamber wall 36 of the second housing component 16 then is telescoped into the engagement wall 28 of the first housing component 14. This telescoped engagement terminates when the end face 34 of the second housing component 16 securely engages against the annular outer support rim 62 of the spring 60.

The telescoped first and second housing components 14 and 16 are secured to one another by a weldment 72 at the location indicated in FIG. 2. More particularly, the weldment 72 is disposed at the interface of the end 29 of the engagement wall 28 on the first housing component 14 and opposed portions of the second housing component 16. The weldment 72 will wick slightly into any minute annular space existing between the overlapped regions of the first and second housing components 14 and 16. However, due to the telescoped engagement of the first and second housing components 14 and 16, the weldment 72 will be spaced from the gas flow path, and the heat associated with the welding operation will be spaced from spring 60. Consequently the performance of the spring 60 will not be affected by the welding heat. In this construction, the valve chamber is securely sealed from ambient conditions and the spring is securely and mechanically held in position in a manner that will not affect the performance of the spring.

Relative dimensions of the valve housing 12, the poppet 46 and the spring 60 bias the spring into a normally closed position. However, a gas flow through the inlet 18 of the check valve 10 will exert forces on the sealing face 50 of the poppet 46. Sufficient gas forces will overcome the biasing forces exerted by the spring 60 and will cause the sealing face 50 of the poppet 46 to move away from the valve seat 22 of the valve housing 12. The non-symmetrical configuration of the spring 60 will cause the side of the poppet 46 that is furthest from the spring legs 66 to lift initially from the valve seat 22. Remaining portions of the poppet 46 then will lift from the valve seat 22. The non-symmetrical configuration of the spring 60 will prevent creation of a resonant condition in which prior art valves would flutter and create noise. Movement of the poppet 46 will be terminated when the backstop 56 contacts all sections 42 of the valve housing 12 between adjacent channels 40 thereof. In this opened condition, gas will flow from the inlet 18 around the outer circumference of the poppet 46, through the channels 40 and into the outlet 38. Upon termination of the gas flow at the inlet 18, the biasing forces of the spring 60 will urge the sealing face 50 of the poppet 46 back into sealing engagement with the valve seat 22.

What is claimed is:

1. A check valve comprising:
   a valve housing formed from first and second housing components in telescoped engagement with one another and formed to define a valve chamber, an inlet to the valve chamber and an outlet from the valve chamber, the inlet and the outlet being substantially coaxially aligned, portions of said valve housing defining said valve chamber including generally planar valve seat concentrically surrounding said inlet and aligned substantially orthogonal to the coaxial aligned inlet and outlet;
   a valving element disposed in said valve chamber and movable from a first position where said valving element sealingly engages portions of said housing surrounding said inlet and a second position where said valving element permits flow from the inlet, through the valve chamber and to the outlet, the valving element having a substantially planar sealing face disposed for sealing engagement with said valve seat, and having an opposed spring engagement face;
   a disk spring having an annular outer support secured between said first and second housing components and having an inner support disposed adjacent the spring engagement face of the valving element, said disk spring being configured for urging said valving element into sealing engagement with portions of said valve housing surrounding said inlet, and being deflectable in response to pressure on said valving element for urging said valving element into an open condition, the disk spring being configured for generating a load on the valving element that is non-symmetrical with respect to the coaxially aligned inlet and outlet; and
   a backstop mounted over the inner support of the disk spring and secured to the spring engagement face of the valving element for securing the inner support of the disk spring to the valving element.

2. The check valve of claim 1, wherein the first and second housing components are welded and sealed in said telescoped engagement at a location spaced from said spring, such that said spring is substantially unaffected by heat generated during welding.

3. The check valve of claim 1, wherein said first and second housing components each are of unitary construction, said outlet extending through said second housing component, portions of said second housing component surrounding said outlet defining a plurality of angularly spaced arcuate channels formed in said second housing component, portions of said second housing component between said channels being configured for engaging portions of said valving element in said second position of said valving element, said channels in said second housing component extending radially beyond portions of said valving element engaging said second housing components for accommodating a flow from said valve chamber and into said outlet when said valving element is in said second position.

4. A check valve comprising:
   a valve housing formed from first and second housing components in telescoped engagement with one another and formed to define a valve chamber, an inlet to the valve chamber and an outlet from the valve chamber, the inlet and the outlet are substantially coaxially aligned, portions of said valve housing defining said valve chamber including generally planar valve seat concentrically surrounding said inlet and aligned substantially orthogonal to the coaxial aligned inlet and outlet, the valving element having a substantially planar sealing face disposed for sealing engagement with said valve seat, and having an opposed spring engagement face for secure engagement with a central portion of said disk spring;
   a valving element disposed in said valve chamber and movable from a first position where said valving element sealingly engages portions of said housing surrounding said inlet and a second position where said valving element permits flow from the inlet, through the valve chamber and to the outlet; and
   a disk spring having an annular outer support secured between said first and second housing components and having an inner support securely connected to the valving element, said disk spring being configured for urging said valving element into sealing engagement with portions of said valve housing surrounding said inlet, and being deflectable in response to pressure on said valving element for urging said valving element into an open condition, wherein the disk spring includes an outer support engaged between the first and second housing components engaging the valve housing, an inner support for engaging the valving element and a plurality of angularly spaced legs extending between said inner and outer support, said legs being unequally spaced around said disk spring, such that said spring transfers loads between said valving element and said housing non-symmetrically relative to the coaxially aligned inlet and outlet.

5. The check valve of claim 4, wherein the inner and outer supports of said spring are substantially annular rims, and wherein said plurality of legs consist of two legs spaced from one another by approximately 120°, said legs extending in non-radial directions between said inner and outer support rims.

6. A check valve comprising:
   a first housing component unitarily formed from a metallic material and formed to include a cylindrical inlet, a valve seat surrounding said inlet, a substantially cylindrical first chamber recess in communication with said inlet, a stop wall extending radially outwardly from said first chamber recess at locations spaced from said inlet, and a cylindrical engaging wall extending axially from radiallly outer portions of said stop wall and away from said first chamber recess;

a second housing component having a cylindrical chamber wall defining a second chamber recess and disposed in telescoped engagement within said cylindrical engagement wall of said first housing component such that said first and second chamber recesses define a valve chamber, an outlet extending through said second housing component and communicating with said valve chamber, telescoped portions of said first and second housing components spaced from said stop wall of said first housing component being sealingly welded to one another;

a valving element disposed in said valve chamber and movable between a first position where said valving element sealingly engages said valve seat and a second position where said valving element is spaced from said valve seat, said valving element being dimensioned to permit flow from said inlet through said valve chamber, around said valving element and to said outlet when said valving element is in said second position;

a disk spring having an outer support secured on said stop wall by said second housing component and having an inner support securely engaged to a central portion of said valving element for urging said valving element into said first position, wherein the disk spring includes a plurality of legs extending between said inner and outer supports, said legs extending in non-radial directions and being unequally spaced around said spring such that said spring generates non-symmetrical loads on said valving element.

* * * * *